324-77.                SR
07-18-72        XR        3,678,252

United States Patent

Payne

[15] 3,678,252

[45] July 18, 1972

[54] PULSE ANALYZER

[72] Inventor: Roy David Payne, London, England

[73] Assignee: International Standard Electric Corporation, New York, N.Y.

[22] Filed: July 28, 1970

[21] Appl. No.: 58,832

[30] Foreign Application Priority Data

Aug. 1, 1969 Great Britain ......................38,734/69

[52] U.S. Cl. ..................235/92 EV, 235/92 EL, 235/92 NT, 324/77 A, 340/347 NT, 235/92 R, 235/92 PB

[51] Int. Cl. ........................................................H03k 21/02

[58] Field of Search ................235/92 T, 92 TF, 92 F, 92 PB, 235/92 EV, 92 EA, 92 EL, 92 NT; 324/78, 76, 77 R, 77 A; 340/347 AD, 347 DD, 347 NT; 328/44, 140; 307/222

[56] References Cited

UNITED STATES PATENTS

| | | | |
|---|---|---|---|
| 3,521,272 | 7/1970 | James | 235/92 EV |
| 3,147,434 | 9/1964 | Cocker | 328/140 X |
| 3,268,857 | 8/1966 | Robinson | 324/77 A |
| 3,348,031 | 10/1967 | Russell et al. | 324/77 A |
| 3,028,550 | 4/1962 | Naydan et al. | 235/151.32 X |

*Primary Examiner*—Maynard R. Wilbur
*Assistant Examiner*—Joseph M. Thesz, Jr.
*Attorney*—C. Cornell Remsen, Jr., Walter J. Baum, Paul W. Hemminger, Charles L. Johnson, Jr. and Thomas E. Kristofferson

[57] ABSTRACT

A system for taking the difference between the duration of a pulse, and the time between pulses including a reversible binary counter to count up during one interval and to count down during a succeeding interval. The count at the end of the succeeding interval is transferred to a binary digital storage register by a set of gates. The output of the storage register is then impressed upon an indicator.

6 Claims, 4 Drawing Figures

Inventor
R. D. PAYNE
By [signature]
Attorney

Inventor
R. D. PAYNE
By [signature]
Attorney

PULSE ANALYZER

BACKGROUND OF THE INVENTION

This invention relates to devices for developing signals in accordance with characteristics of the output signal of a pulse generator, and more particularly, to a system for producing an output signal in accordance with the difference between the duration of a pulse and the time between pulses.

In the past, it has been difficult to assign unskilled people to make a test to determine the said time differential of a pulse train.

SUMMARY OF THE INVENTION

In accordance with the device of the present invention, the above-described and other disadvantages of the prior art are overcome by providing a pulse generator in addition to the source of the pulses to be tested. The pulse generator generates pulses at a repetition frequency substantially higher than that of the source. Thus, by counting the output of the pulse generator with a digital counter, it is possible to obtain signal outputs directly proportional to the durations to be measured. Subtraction means may then be employed to provide a digital indication of the said time differential.

According to another feature of the invention, the subtraction means includes a reversible binary counter. According to a further feature of the invention, a storage register is provided to store the output of the reversible counter when it produces an output directly proportional to the said time differential. The storage register thus stores the signal representing the time differential while the reversible counter is operated to compute the time differential once again.

Indicator lights are connected from the storage register to indicate the state thereof.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
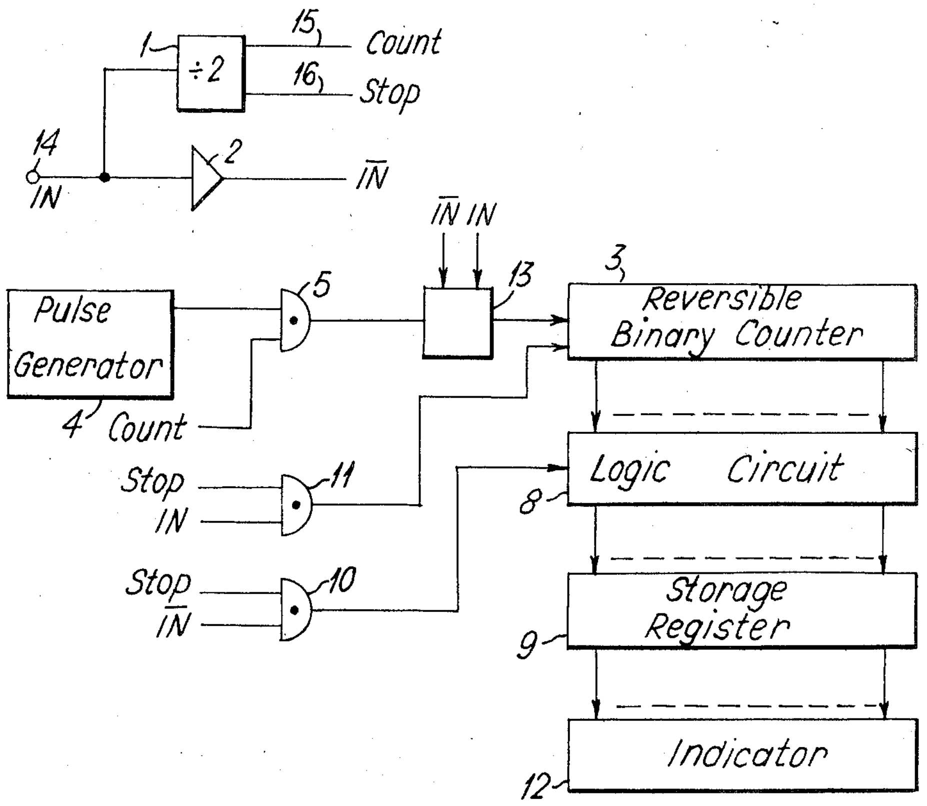
FIG. 1 is a block diagram of the system of the present invention.

In the drawings in FIG. 1, rectangular pulses of various widths may be applied to an input terminal 14. Of course, the width of the pulses applied at input terminal 14 will be constant during their application. For example, different pulse generators may be connected to terminal 14 having different pulse widths. The same is true of pulse frequencies thereof.

A binary digital counter 1 having a conventional flip-flop output maintains one output 15 high for one period equal to that of the time between pulses at 14, and another output 16 high during alternate periods. The signals on outputs 15 and 16 are thus bi-level as any flip-flop output. The output at 15 may be identified as the COUNT output. The output at 16 may be identified as the STOP output. The input signal at terminal 14 may be identified as IN. The complement of the IN signal is $\overline{\text{IN}}$. The $\overline{\text{IN}}$ signal is taken from an inverter 2 connected from input terminal 14.

An AND-gate 5 receives an input from a pulse generator 4. AND-gate 5 also receives a COUNT input. The output of AND-gate 5 is passed to a reversible binary counter 3 through control means 13. Control means 13 receives one IN input and one $\overline{\text{IN}}$ input.

A logic circuit 8 is connected from counter 3. A storage register 9 is connected from logic circuit 8. An indicator 12 is connected from storage register 9.

An AND-gate 11 receives a STOP input and an IN input to provide a reset pulse for counter 3.

Figure 4:
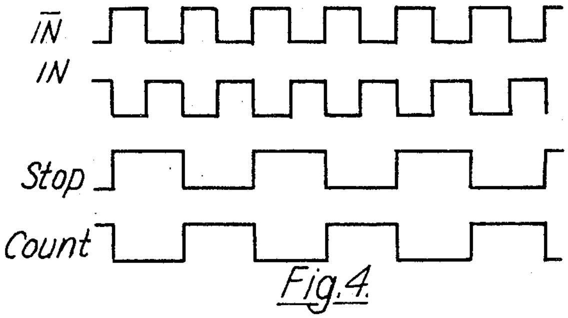
FIG. 4 is a graph of a group of waveforms characteristic of the operation of the invention.

An AND-gate 10 receives a STOP input and in $\overline{\text{IN}}$ input to actuate circuit 8. IN, $\overline{\text{IN}}$, COUNT and STOP waveforms are shown in FIG. 4.

OPERATION

In the operation of the invention shown in FIG. 1, pulse generator 4 generates pulses at a repetition rate much greater than that of the IN signal. The output pulses of pulse generator 4 are allowed to pass to control means 13 when the COUNT signal is high. Note that this includes one entire cycle of the signal. This cycle is divided into two parts by the introduction of the IN signal and the $\overline{\text{IN}}$ signal to control means 13. Thus, for example, during the time that the signal is high, control 3 is supplied with only positive pulses by control means 13. Control means 13 then supplies all negative pulses to counter 3 during the $\overline{\text{IN}}$ high period. Counter 3 then counts down during the $\overline{\text{IN}}$ period and counts up during the IN period.

After one complete cycle of the IN signal, gate 10 causes logic circuit 8 to transfer the contents of counter 3 to storage register 9. The output of storage register 9 is indicated by indicator 12.

Figures 2, 3:
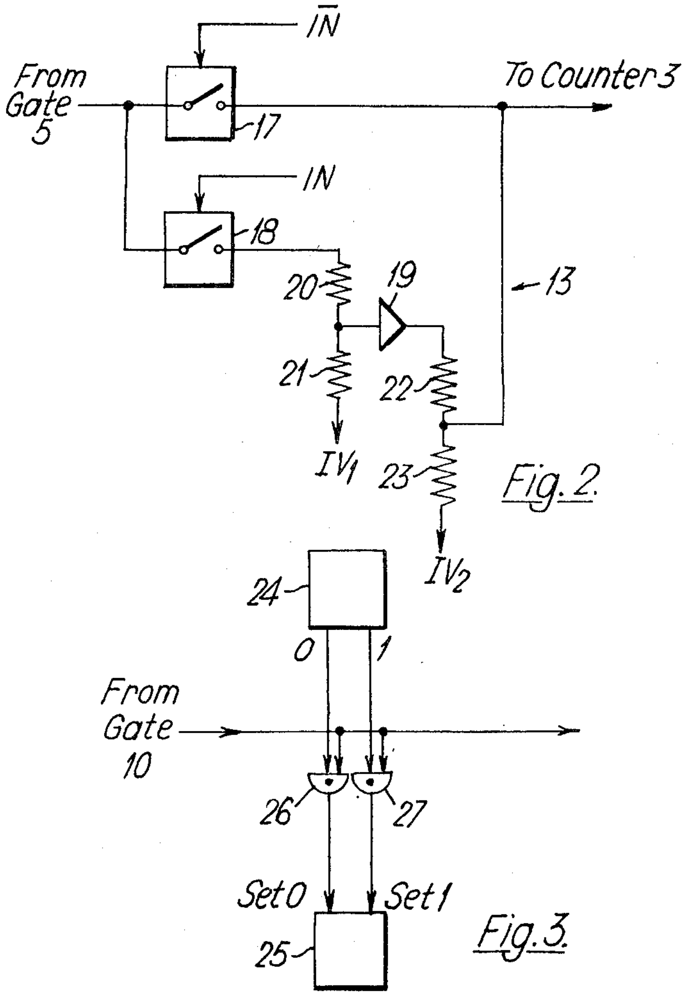
FIG. 2 is a more detailed schematic diagram of one of the blocks shown in FIG. 1.
FIG. 3 is a more detailed block diagram of a block shown in FIG. 1.

Control means 13 is shown in FIG. 2 including two electrical switches 17 and 18 which alternately provide positive and negative pulses to counter 3. Control means 13 includes an inverter 19 for that purpose having level shifting resistors 20, 21, 22, and 23, if desired.

Counter 3 is a binary digital counter having flip-flops at 24 in FIG. 3, the flip-flops being so controlled that the counter counts up in response to positive pulses and down in response to negative pulses. Only one flip-flop 24 is shown as an example. Counter 3 will, of course, contain several or many. Storage register 9 also includes a plurality of flip-flops 25 corresponding to the number of flip-flops in counter 3. The transfer of information is conventional to the extent that simple AND-gates 26 and 27 responsive to the output of AND-gate 10 transfer the information in flip-flops 24 to flip-flops 25.

Indicator 12 may be as sophisticated or as simple as desired. For example, if desired, indicator 12 may simply include one lamp for each flip-flop 25 to indicate "1" setting thereof.

What is claimed is:

1. The method of signal evaluation, said method comprising the steps of: generating a periodic signal to be tested, said signal having high level portions and a low level portion between each two successive high level portions, one high level portion and one low level portion forming one complete cycle, said periodic signal having a frequency of a first predetermined number of said signal cycles per unit time; generating pulses periodically with the time between two successive pulses forming one complete cycle, said pulses having a constant frequency of a second predetermined number of said pulse cycles per the same said unit of time, said pulse frequency being large in comparison to said signal frequency and independent of the amplitude of said signal; and producing an output of a magnitude corresponding to the difference between the number of pulses generated during a high level portion of said periodic signal and the number of pulses generated during a low level portion of the self same said periodic signal.

2. Time measuring apparatus comprising: first means to supply a periodic IN signal to be tested, said signal having high level portions and a low level portion between each two successive high level portions, one high level portion and one low level portion forming one complete cycle, said periodic signal having a frequency of a first predetermined number of said signal cycles per unit time; a pulse generator to supply pulses periodically with the time between two successive pulses forming one complete cycle, said pulses having a constant frequency of a second predetermined number of said cycles per the same said unit of time, said pulse frequency being large in comparison to said signal frequency and independent of the amplitude of said signal; second means for producing an output of a magnitude corresponding to the difference between the number of pulrses generated during a high level portion of said IN signal and the number of pulses generated during a low level portion of the self same said IN signal.

3. The invention as defined in claim 2, wherein the level of said periodic signal is approximately constant during any one portion, said second means including a first binary counter connected from said first means to produce a bi-level COUNT signal at one output which is high over alternate cycles of said IN signal and which is low the remainder of the time, said counter, at another output, also producing a STOP signal complement to said COUNT signal, and an inverter having an output, said inverter producing an $\overline{\text{IN}}$ signal complement to said IN signal, a reversible binary counter to produce an output in accordance with the number of pulses of one polarity introduced thereto minus the number of pulses introduced thereto of a polarity opposite said one polarity, a first AND gate having two inputs connected from said pulse generator and said COUNT output, respectively, said first AND gate having an output, third means responsive to said IN and $\overline{\text{IN}}$ signals to supply positive and negative pulses to said reversible counter at said pulse frequency; pulses of one polarity being supplied only while said IN signal is high, and pulses of the opposite polarity being supplied only when said $\overline{\text{IN}}$ is high, a storage register, a logic circuit, a second AND gate connected from said inverter $\overline{\text{IN}}$ output and from said STOP output to said logic circuit, said logic circuit having a plurality of third AND gates connected from each bit in said reversible counter to a corresponding bit in said storage register, all of said third gates transferring the contents of said reversible counter to said storage register upon receipt of a high level signal from said second AND gate, a fourth AND gate connected from said first means IN output and from said STOP output to said counter, a high output from said fourth AND gate causing said reversible counter to reset to zero, and means to indicate the state of said storage register.

4. The invention as defined in claim 2, wherein said second means includes a reversible counter, means to cause said counter to count the output pulses of said generator in one direction during a high level portion, and to count in the opposite direction during a low level portion.

5. The invention as defined in claim 2, including third means to store the output of said second means, and gating means actuable to transfer the output of said second means into said third means.

6. The invention as defined in claim 5, including means to actuate said gating means during a period not exceeding the period of said first means signal.

* * * * *